United States Patent
Hart et al.

(10) Patent No.: US 10,568,134 B2
(45) Date of Patent: *Feb. 18, 2020

(54) ENHANCED CLEAR CHANNEL ASSESSMENT

(71) Applicant: Cisco Technology, Inc., San Jose, CA (US)

(72) Inventors: Brian D. Hart, Sunnyvale, CA (US); David Kloper, Santa Clara, CA (US); Pooya Monajemi, Irvine, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,480

(22) Filed: Jul. 17, 2018

(65) Prior Publication Data

US 2018/0343674 A1 Nov. 29, 2018

Related U.S. Application Data

(63) Continuation of application No. 15/150,708, filed on May 10, 2016, now Pat. No. 10,075,976.

(60) Provisional application No. 62/251,858, filed on Nov. 6, 2015.

(51) Int. Cl.
*H04W 74/08* (2009.01)
*H04L 5/00* (2006.01)
(Continued)

(52) U.S. Cl.
CPC .............. *H04W 74/08* (2013.01); *H04L 1/00* (2013.01); *H04L 5/0055* (2013.01);
(Continued)

(58) Field of Classification Search
CPC .............. H04L 5/0055; H04W 52/245; H04W 52/367; H04W 72/0473; H04W 74/08
See application file for complete search history.

(56) References Cited

U.S. PATENT DOCUMENTS 7,688,762 B2  3/2010  Douglas et al.
7,720,440 B2  5/2010  Zhu et al.
(Continued)

OTHER PUBLICATIONS

R. Hedayat et al., "TXOP Considerations for Spatial Reuse", doc.: IEEE 802.11-15/1104r1, Sep. 12, 2015, 17 pages.
(Continued)

*Primary Examiner* — Kevin C. Harper
*Assistant Examiner* — Derrick V Rose
(74) *Attorney, Agent, or Firm* — Edell, Shapiro & Finnan, LLC (57) ABSTRACT

A third device stores a receive signal strength of a received response data unit transmitted by a second device after receiving a first data unit transmitted by a first device. The third device obtains a clear channel access parameter included in a header of a second data unit transmitted by the first device to the second device and detects transmission exchanges in each of a plurality of service sets to use as samples of overlapping service set activity. The third device determines a minimum transmit power to be used by the third device to send a transmission to the fourth device based on transmission exchanges between devices in a particular service set. The third device determines whether to send a transmission to the fourth device based on the clear channel access parameter and minimum transmit power.

20 Claims, 8 Drawing Sheets (51) Int. Cl.
  *H04W 72/04* (2009.01)
  *H04W 52/24* (2009.01)
  *H04W 52/36* (2009.01)
  *H04L 1/00* (2006.01)
  *H04W 52/22* (2009.01)
  *H04W 52/46* (2009.01)

(52) U.S. Cl.
  CPC ....... *H04W 52/228* (2013.01); *H04W 52/245* (2013.01); *H04W 52/367* (2013.01); *H04W 52/46* (2013.01); *H04W 72/0473* (2013.01); *H04W 74/0808* (2013.01)

(56) References Cited

U.S. PATENT DOCUMENTS

| | | |
|---|---|---|
| 7,801,546 B2 | 9/2010 | Yang et al. |
| 2006/0046739 A1 | 3/2006 | Blosco et al. |
| 2006/0109787 A1 | 5/2006 | Strutt et al. |
| 2007/0060155 A1 | 3/2007 | Kahana et al. |
| 2015/0071204 A1 | 3/2015 | Seok |
| 2016/0174079 A1 | 6/2016 | Wang et al. |
| 2016/0381688 A1 | 12/2016 | Hedayat |
| 2017/0070962 A1 | 3/2017 | Wang et al. |
| 2017/0135131 A1 | 5/2017 | Hart et al. |

OTHER PUBLICATIONS

J. Son et al., "Further Considerations on Enhanced CCA for 11ax", doc.: IEEE 802.11-14/0847r1, Jul. 15, 2014, 12 pages.

T. Itagaki et al., "Performance Analysis of BSS Color and DSC", doc.: IEEE 802.11-15/0045r0, Jan. 12, 2015, 14 pages.

R. Porat et al., "Improved Spatial Reuse Feasibility—Part I", doc.: IEEE 802.11-14/0082r0, Jan. 20, 2014, 19 pages.

Tytgat et al., "Avoiding collisions between IEEE 802.11 and IEEE 802.15.4 through coexistence aware clear channel assessment", EURASIP Journal on Wireless Communications and Networking, Apr. 10, 2012, 15 Pages.

ENHANCED CLEAR CHANNEL ASSESSMENT

PRIORITY CLAIM

This application is a continuation of U.S. patent application Ser. No. 15/150,708, filed May 10, 2016, which in turn claims priority to U.S. Provisional Patent Application No. 62/251,858, filed Nov. 6, 2015. The entirety of each of these applications is incorporated herein by reference.

TECHNICAL FIELD

The present disclosure relates to wireless networks.

BACKGROUND

Channel sensing, sometimes referred to as clear channel assessment (CCA), is a logical function that determines the current state of use of a wireless medium. Clear Channel Assessment is implemented in the physical layer signal processing of a wireless device and aids in contention avoidance on the wireless medium.

DESCRIPTION OF EXAMPLE EMBODIMENTS

Overview

Presented herein are enhanced clear channel assessment techniques. A wireless network environment is provided that includes first and second devices that are part of a first service set and third and fourth devices that are part of a second service set, and the third and fourth devices being in sufficient proximity to the first and second devices so as to receive transmissions sent between the first and second devices. The third device stores a receive signal strength of a received response data unit transmitted by the second device in response to reception by the second device of a first data unit transmitted by the first device, and obtains a clear channel access parameter included in a header of a second data unit transmitted by the first device to the second device. The third device detects transmission exchanges in each of a plurality of service sets for use as samples of overlapping service set activity in the wireless network environment, and determines a transmit power to be used by the third device, with respect to a particular subset of the plurality of service sets, based on the transmission exchanges between devices in the particular subset of the plurality of service sets. The third device determines whether to send a transmission from the third device to the fourth device based on a comparison of the clear channel access parameter with a sum of the transmit power to be used by the third device for transmission to the fourth device and the receive signal strength of the received response data unit.

Detailed Description

Conventional Clear Channel Assessment (CCA) techniques prevent nearby transmissions that could occur without creating interference at the original link (Spatial reuse). Conventional Clear Channel Assessment techniques also strive to protect the region around the transmitter. As such, there is a need for new Clear Channel Assessment techniques. However, recently proposed Clear Channel Assessment proposals do not discriminate very well in the sense that the underlying algorithms enable both "good" parallel transmissions (i.e., transmissions that don't interfere with the original link) and "bad" parallel transmissions (i.e., transmissions that do interfere with the original link). An underlying problem of conventional and recent Clear Channel Assessment techniques is that these algorithms attempt to protect the transmitter, when, in fact, it is the receiver that needs protection.

As such, presented herein are simple and safe Clear Channel Assessment techniques that protect the receiver (RX) directly, instead of protecting the transmitter (TX) as a proxy for the receiver. The techniques presented herein, called opportunistic adaptive clear channel access (OACCA) techniques, enable spatial reuse near a transmitter/initiator of a Request-to-Send/Clear-to-Send/Data/Acknowledgment (RTS/CTS/Data/Ack) (or similar) transmission opportunity (TXOP). The initiator advertises CCA-related parameters in the Physical Layer Convergence Protocol (PLCP) header of the Data PLCP protocol data unit (PPDU) using data measured from the CTS. A third party station (STA) can use the advertised information and its own received signal strength indicator (RSSI) measurements from the CTS to know at what transmit power the third party can use for its own transmission. Also, the maximum transmission time (TXTIME) for the third party's transmission is known from the PLCP header of the Data PPDU. A margin can provide more/less protection to the Data PPDU, which can be made dependent on the modulation coding scheme (MCS) indicated in the PLCP header of the Data PPDU.

Also presented herein are extensions for a fourth party to acknowledge the third party's transmission, for RTS/CTS between the third and fourth parties, as well as extensions for simple and safe Clear Channel Assessment enabling spatial reuse near uplink multi-user multiple-input multiple output (UL-MU-MIMO) and uplink orthogonal frequency division multiple access (UL-OFDMA) transmissions and extensions for transmissions without RTS/CTS or shortPpdu/Ack, broadcasts, DL-MU-MIMO/OFDMA.

The techniques presented herein provide a Clear Channel Assessment in a simple, safe, and distributed manner with no averaging and trivial state at the STAs. The techniques presented herein do not rely on isotropic antennas and work even for omnidirectional and directional antennas with basic extensions to beamforming/antenna switching.

Figure 1:
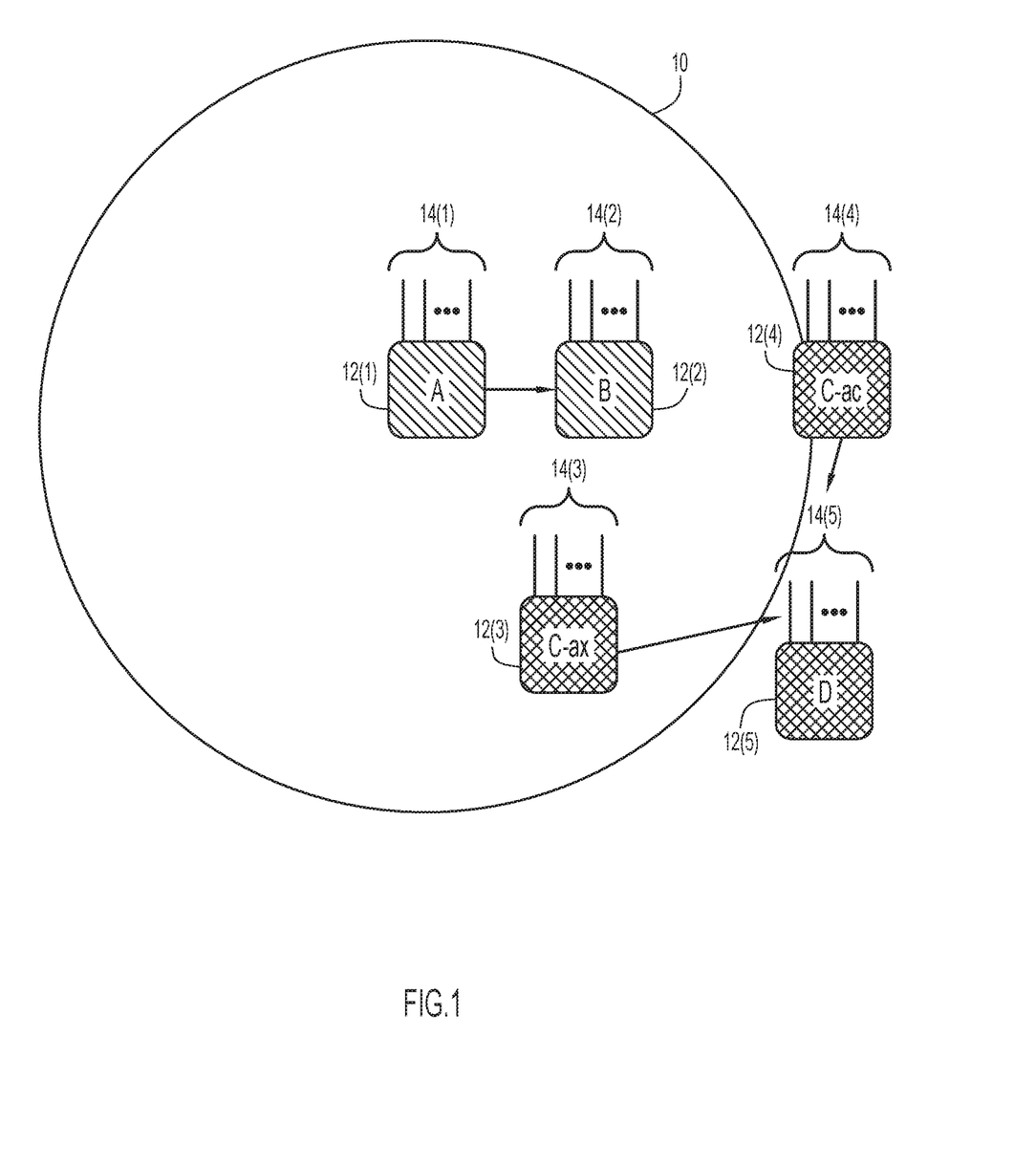
FIG. 1 is a diagram of a wireless network environment in which the clear channel assessment techniques presented herein may be employed according to an example embodiment.

Reference is first made to FIG. 1. In one example of the techniques presented herein, there are four (4) wireless devices: device A, device B, device C, and device D, all generally within radio frequency (RF) proximity as shown at reference numeral 10 such that they can detect transmissions sent between each other. Devices A and B are in the same Basic Service Set (BSS), e.g., a first BSS indicated by horizontal hatching, while devices C and D are in a different BSS, e.g., a second BSS indicating by crisscross hatching. Thus, FIG. 1 shows overlapping BSS's. A BSS provides the basic building-block of an 802.11 wireless LAN. In infrastructure mode, a single access point (AP) together with all associated stations (STAs) is a BSS.

As shown in FIG. 1, device C may take either of two forms denoted C-ax (if compliant with the IEEE 802.11ax standard) or C-ac (if compliant with the IEEE 802.11ac standard). Device A wishes to transmit a long PPDU to device B, and device C wishes to transmit to device D. Devices A, B and C-ax are all, for example, Institute of Electrical and Electronics Engineers (IEEE) 801.11ax-enabled devices. However, the techniques may be implemented with devices that follow another 802.11 amendment, another standard, or another specification. Devices A, B, C-ax, C-ac and D are also identified by reference numerals 12(1), 12(2), 12(3), 12(4) and 12(5), respectively. Each of these devices may have one or a plurality of antennas, as denoted at reference numerals 14(1)-14(5), respectively.

Figure 2:
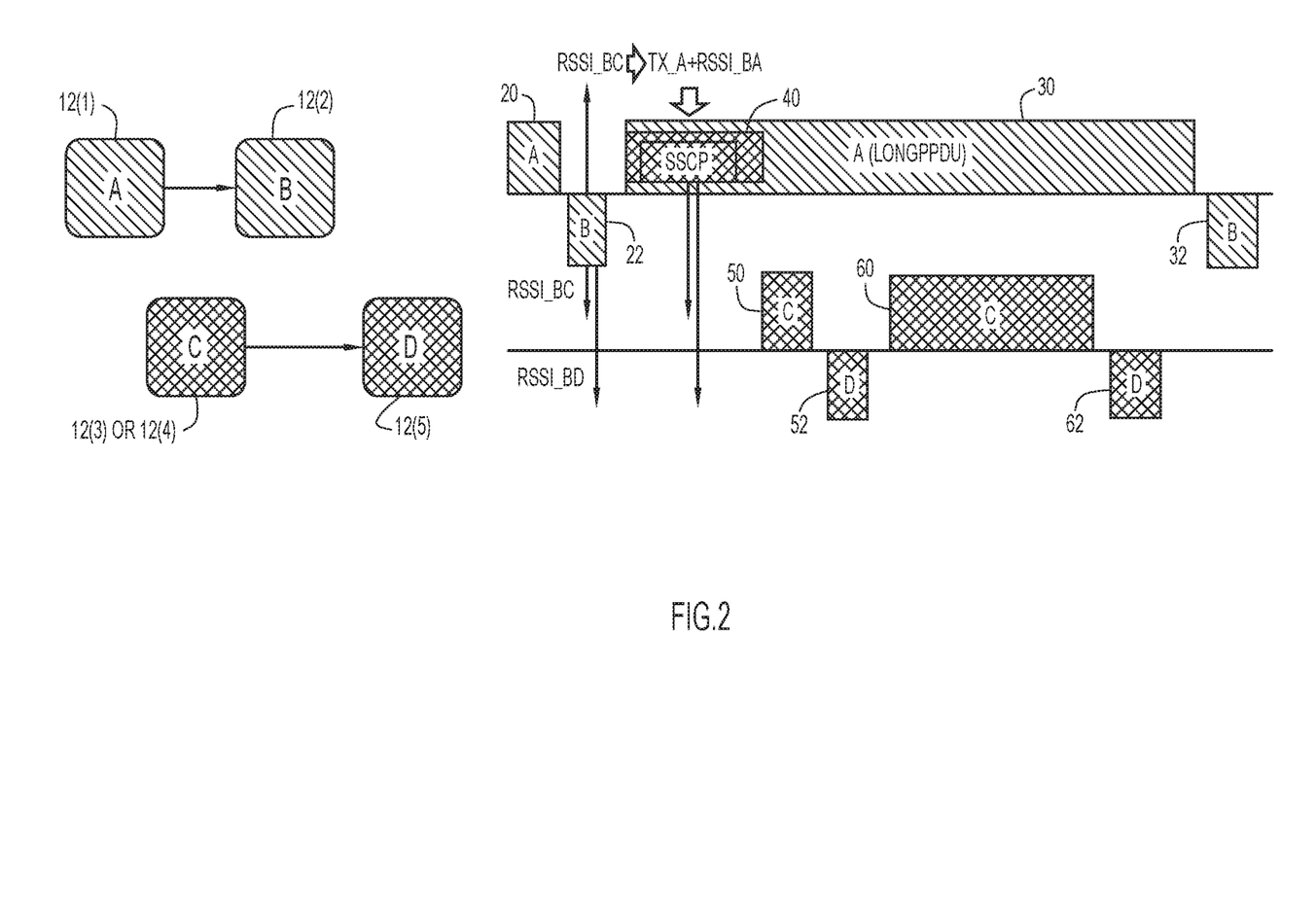
FIG. 2 is a timing diagram depicting the signals transmitted between the wireless devices shown in FIG. 1, according to an example embodiment.

Reference is now made to FIG. 2. Device A contends and becomes the TXOP holder. Device A initiates a transmission sequence to device B by transmitting to device B a first data unit 20 that is configured to provoke a response data unit 22 by device B, followed by transmission to device B of a second data unit 30 to which device B is to send an acknowledgment 32. For example, devices A and B perform a short PPDU/response PPDU/long PPDU/acknowledgement sequence. The first data unit 20 (e.g., short PPDU) may be a Request-to-Send (RTS) frame and the second data unit 22 (e.g., response PPDU) may be a Clear-to-Send (CTS) frame. In the middle of this TXOP, device A records the RSSI of the response PPDU as RSSI_BA, and device A combines the recorded RSSI (RSSI_BA) with the conducted transmit power it used for the long PPDU, referred to as TX_A, to compute a clear channel access parameter referred to as the "simpleSafeCcaParameter." In other words, the simpleSafeCcaParameter (SSCP) is defined as:

simpleSafeCcaParameter=TX_A+RSSI_BA, where RSSI_BA is the RSSI of device B's transmission received at device A.

Device A quantizes the simpleSafeCcaParameter to a several bits (e.g., 5 bits at 3 dB resolution, 4 bits at 6 dB resolution, etc.) and includes the quantized simpleSafeCcaParameter (SSCP) in the PLCP header 40 of the long PPDU 30, sent robustly in the preamble of the transmission (e.g. in the PLCP header in accordance with the IEEE 802.11ax PHY format).

Device C detects the presence of the response PPDU (e.g., a preamble SIFS after the short PPDU; or a MAC header in a PPDU with RA==TA of frame in PPDU starting SIFS beforehand) and records its RSSI as RSSI_BC. Device C also receives the simpleSafeCcaParameter from the PLCP header of the long PPDU from device A.

In one embodiment, device C is permitted to transmit to device D under the following conditions:
 a. simpleSafeCcaParameter>TX_C+RSSI_BC+Margin; and
 b. The C/D TXOP completes before the end of the longPpdu sent by device A.

For example, device C may transmit a first (short PPDU), such as an RTS frame, shown at 50, to provoke a short response PPDU (such as a CTS frame), shown at reference numeral 52, from device D. Thereafter, device C can transmit a longer PPDU 60 to which device D can sent an acknowledgment 62.

Device D is permitted to respond to device C under the following condition:

simpleSafeCcaParameter>TX_D+RSSI_BD+Margin.

In another embodiment, device C is permitted to transmit to device D when the following conditions are satisfied:
 a. No immediate response is solicited from device D;
 b. The transmission by device C completes before the end of the long PPDU sent by device A; and
 c. simpleSafeCcaParameter>TX_C+RSSI_BC+Margin.

Device C is aware of its own conducted power that it will use to transmit to device D, where this power is referred to as TX_C. Device C may reduce TX_C in order to comply with the above transmission condition c) (i.e., simpleSafeCcaParameter>TX_C+RSSI_BC+Margin). This is the same for device D. The Margin could be a fixed number, or an MCS-dependent number plus a fixed additional margin. The fixed margin or additional margin might be standardized or advertised by the AP. In a further embodiment, M may be included in the transmitted parameter: i.e. simpleSafeCcaParameterAlternate=simple SafeCcaParameter−Margin. If device C cannot even hear the response PPDU, then device C can use some low RSSI at its sensitivity instead (e.g. −82 dBm).

Device B can receive a PPDU from device A even if device C transmits so long as:

$$TX\_A+G\_AB-PL\_AB>TX\_C+G\_CB-PL\_CB+M \quad (1),$$

where $G\_xy=G\_yx$ is the antenna gain between x and y, $PL\_xy=PL\_yx$ is the pathloss between x and y and M is Margin. For now, the antenna gain is assumed to be static (i.e. no antenna switching or digital beamforming).

As shown above, observable at device C are the simpleSafeCcaParameter=TX_A+RSSI_BA); TX_C; RSSI_BC (RSSI_BC is RSSI of B's transmission heard at C); and M. Also known are:

$$TX\_B+G\_AB-PL\_AB=RSSI\_BA \quad (2)$$

$$TX\_B+G\_BC-PL\_BC=RSSI\_BC \quad (3)$$

Rearranging (2) and (3) yields:

$$G\_AB-PL\_AB=RSSI\_BA-TX\_B \quad (2a)$$

$$G\_BC-PL\_BC=RSSI\_BC-TX\_B \quad (3a)$$

Inserting (2a) and (3a) into (1) yields:

$$TX\_A+RSSI\_BA-TX\_B>TX\_C+RSSI\_BC-TX\_B+M \quad (1a).$$

Cancelling −TX_B on both sides, yields:

$$TX\_A+RSSI\_BA>TX\_C+RSSI\_BC+M \quad (1b).$$

As noted:

$$simpleSafeCcaParameter=TX\_A+RSSI\_BA \quad (4)$$

Inserting (4) into (1b) yields:

$$simpleSafeCcaParameter>TX\_C+RSSI\_BC+M \quad (1c).$$

Therefore, equation (1c) provides a simple rule for device C where all parameters (a, b, and c) are observable at device C.

As described above in connection with FIG. 1, the devices A, B, C and D may have a single antenna or a plurality of antennas. A plurality of antennas, and associated signal processing, enables a device to beamform a transmission to another device, and also enables a device to send multiple spatial streams simultaneously using multiple-input multiple-output (MIMO) wireless communication techniques. Furthermore, devices equipped with multiple antennas and associated signal processing capability can participate in multi-user MIMO communication (MU-MIMO) techniques in which one device can simultaneously send multiple transmissions to respective ones of a plurality of destination devices.

In the above examples, device D (I) is only solicited for an Ack/Block Ack (BA) by device C if (II) device C successfully performs an RTS/CTS, (III) the antenna gain is assumed static, and device C cannot transmit (IV) when device A is soliciting an uplink-orthogonal frequency division multiple access (UL-OFDMA) or uplink-multi-user MIMO (UL-MU_MIMO) transmission, (V) when device A's transmit opportunity (TXOP) does not start with a RTS/CTS or shortPpdu/Ack, or (VI) when device A is transmitting a downlink-OFDMA/downlink MU-MIMO (DL-OFDMA/DL-MU-MIMO) transmission. The above techniques may be extended to at least partially address these issues, wherein extending the above to address these issues, noting that issues (V) and (IV) can be solved but at higher scanning, OBSS frame parsing and storage costs at device C.

Regarding issue (II), if device D is IEEE 802.11ax-enabled, then it can perform Clear Channel Assessment in the same way as device C, and determine if its response frame(s) (CTS, Ack, BA, etc.) do not interfere with the reception of device A's PPDU at device B. If Clear Channel Assessment at device D looks clear, then it can send an immediate acknowledgement before the end of device A's PPDU to device B. The immediate acknowledgement might be an "unsolicited BA" or, in certain examples, a new Block Ack Response (BAR) mode (e.g., respond if possible, else wait for poll).

Regarding issue (III), the RSSI detected at each device will depend on whether beamforming/no beamforming is used during each of the PPDUs. The PPDUs carrying RTS/CTS are typically not beamformed, but the long PPDU, and potentially device C's transmission to device D, might be beamformed. In this case, the rule evolves (math omitted) to yield:

$$TX\_A+BF\_AB,B+RSSI\_BA>TX\_C+BF\_CB,D+RSSI\_BC+M \quad (III\text{-}1b)$$

where BF_AB,B is the additional beamforming gain between device A and device B when device A is sending a PPDU to device B, and is greater than or equal to 0 dB under almost all circumstances, and BF_CB,D is the additional beamforming gain between device C and device B when device C is sending a PPDU to device D, and is less than or around 0 dB under almost all circumstances.

Accordingly, presented are additional embodiments. For example, device A, knowing the channel state information (CSI) from device A to device B, may compute BF_AB,B and send:

simpleSafeCcaParameter=$TX\_A+BF\_AB,B+RSSI\_BA$.

Alternatively, it is possible to leave BF_AB,B=0. Knowing the CSI from device B to device C, and assuming channel reciprocity (perhaps with device C's TX/RX calibration), device C may use BF_CB,D in its transmit decision as:

simpleSafeCcaParameter>$TX\_C+BF\_CB,D+RSSI\_BC+M$.

In a further alternative, it may be possible to leave BF_CB,D=0. If either device A or device C (or both) perform the simplified operation (i.e., make simpleSafeCcaParameter=$TX\_A+BF\_AB,B+RSSI\_BA$ and/or make simpleSafeCcaParameter>$TX\_C+BF\_CB,D+RSSI\_BC+M$), under the assumptions that BF AB,B=0 and BF CB,D<=0, from above, the effect is that device C needs to transmit at a lower conducted power than it might otherwise, or not transmit at all. This implies less interference to the transmission from device A to device B, so no harm is done.

Regarding issue (IV), for UL-MU-MIMO or UL-OFDMA, device A is the receiver and the clients (device Bs) are the transmitters. Typically, there is some brief polling by device A of the device Bs (e.g., "do you have traffic for me") followed shortly by device A's trigger frame to solicit transmissions from the device Bs, followed (after approximately an SIFS) by the uplink transmissions from the device Bs. From the buffer polling (or PS-Poll frames or unscheduled automatic power-save delivery (UAPSD) trigger frames), device A has a good estimate of the RSSI from each device B to device A at device B's nominal conducted power (RSSI_BA). In certain examples, the buffer poll frame could include device B's RSSI measurement of a PPDU from device A, referred to as RSSI_BA.

Alternatively, the trigger frame is expected to specify some power control (since this is required for UL-MU-MIMO or UL-OFDMA to work reasonably reliably). In this way, device A has a good idea of TX_B or RSSI_BA for all the B devices. Using similar computations as above, it is possible to show that device A should send simpleSafeCcaParameter=$TX\_A+\min(TX\_A-TX\_B+RSSI\_BA)$ or simpleSafeCcaParameter=$TX\_A+\min(RSSI\_BA)$, if RSSI_BA is available in the PLCP header of the PPDU carrying a trigger frame, plus an indication that this is a trigger frame (which may be 1 new bit in the PLCP, for range, or the existing MAC-level frame type/subtype field).

In one embodiment, device C measures RSSI_AC from the Trigger PPDU, and is permitted to transmit to device D under the following conditions:
  a. simpleSafeCcaParameter>$TX\_C+RSSI\_AC+\text{Margin}$; and
  b. The C/D TXOP completes before the end of the longPpdu sent by the device B's.

Device D is permitted to respond to device C under the following conditions:

simpleSafeCcaParameter>$TX\_D+RSSI\_AD+\text{Margin}$.

In another embodiment, device C measures RSSI_AC from the Trigger PPDU and is permitted to transmit to device D under the following conditions:
  a. No immediate response is solicited from device D, unless device D also performs simple safe CCA before device D's response;
  b. The transmission by device C (plus any acknowledgement from device D) completes before the end of the long PPDU sent by device A; and
  c. simpleSafeCcaParameter>$TX\_C+RSSI\_AC+\text{Margin}$.

Regarding issue (V), if device A's TXOP does not start with RTS/CTS or a shortPpdu/Ack, then the CCA rule can work, but more operations are required at device A and device C. In particular, device A needs to use a recent transmission from device C to device A to measure RSSI_BA (and may add a safety factor dependent on age, if retried, MCS, if beamforming was indicated, etc.). Device C needs to scan and measure the RSSI of other clients to measure RSSI_BC (and may add a safety factor dependent on age, if retried, MCS, if beamforming was indicated, etc.). If device C does not perform the scanning or does not have information about RSSI_BC, device C is not permitted to transmit during the long PPDU. This incentivizes device C to scan and may limit this mode of operation to devices with wall power or large batteries (e.g., APs, laptops).

Regarding issues (III) and (V), yet another embodiment is described below. If device B is using beamforming to transmit to device A, device B quantizes its expected beamforming gain to a few bits and includes the quantized beamforming gain in the PLCP header of its transmitted PPDU. Using this information, device A may adjust its computation of the simpleSafeCcaParameter as follows:

$$simpleSafeCcaParameter=TX\_A+BF\_AB,B+RSSI\_BA-BF\_BA,A$$

Furthermore, regarding issues (III) and (V), it is observed that beamforming gains can vary widely over time. As a result, device A can adjust the BF_AB,B and BF_BA,A values by conservatively choosing the BF_AB,B from a lower percentile of the gain's distribution over time, and choosing the BF_BA,A from a higher percentile of the gain's distribution.

Thus, device A may compute the simpleSafeCcaParameter based on a beamforming gain from the first device to the second device. Furthermore, the simpleSafeCcaParameter may be computed based on a minimum of a sum of a beamforming gain from the first device to the second device and the receive signal strength of the response data unit, over a plurality of second devices in the first basic service set.

Regarding issue (VI), a broadcast DL-OFDMA/DL-MU-MIMO transmission is an extension of (IV), where an AP sends simpleSafeCcaParameter=TX_A+min(BF_AB,B+RSSI_BA) and the minimum (min) is over many device B recipients in the AP's BSS, and device C applies simpleSafeCcaParameter>TX_C+max(RSSI_BC+Margin, where the max(RSSI_BC) is over all clients addressed by the broadcast or DL transmission, or (for simplicity) over all clients with the same BSS COLOR as the sender of the broadcast or DL transmission.

BSS color is indicated by a plurality of bits, e.g., 6 bits, and is used to denote different BSS's that are operating on the same channel. Each BSS has a different color that enables clients to know whether a transmission is within their BSS or not after decoding the SIG field. Transmissions within the BSS are deferred to at the lowest possible level in order to provide the lowest sensitivity and prevent intra-BSS multiple unsynchronized transmissions. Transmissions which belong to an OBSS (different color) are deferred to using the CCA techniques presented herein. Said another way, a BSS color is a subset of a plurality of service sets.

As an additional means for addressing OBSS interference issues, device A can count the number of times it has discontinued decoding a PPDU received above the CCA level and switched to decoding another stronger PPDU, where the stronger PPDU has been an OBSS IEEE 802.11ax PPDU. This count is measured over a recent time window and can be added as a penalty to the simpleSafeCcaParameter. This, in effect, acts as a quasi-closed-loop power control to reduce transmit power in the neighboring OBSS.

Figure 3:
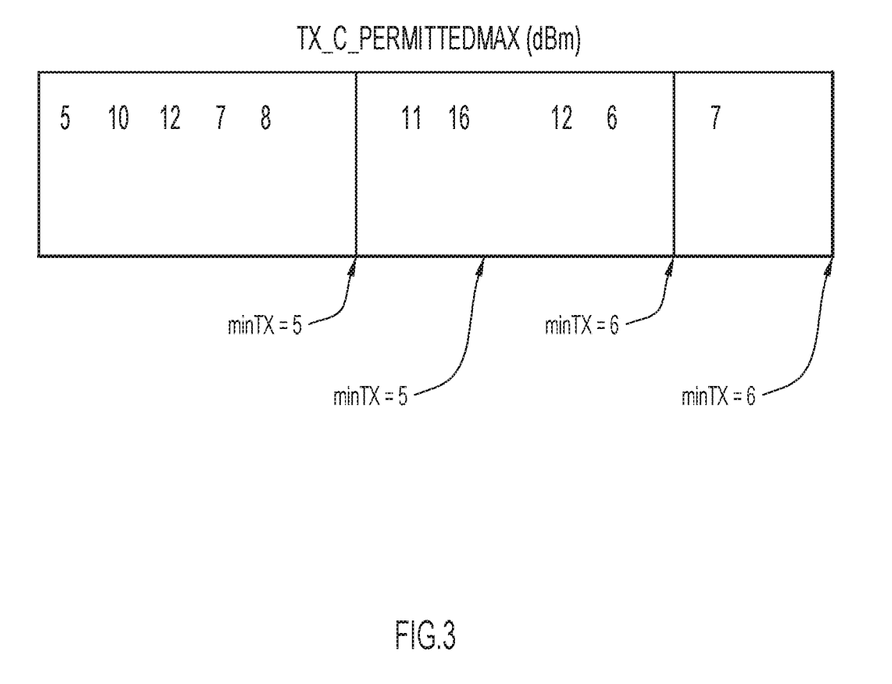
FIG. 3 is a diagram of depicting calculations made by a wireless device in accordance with an example embodiment.
Figure 4:
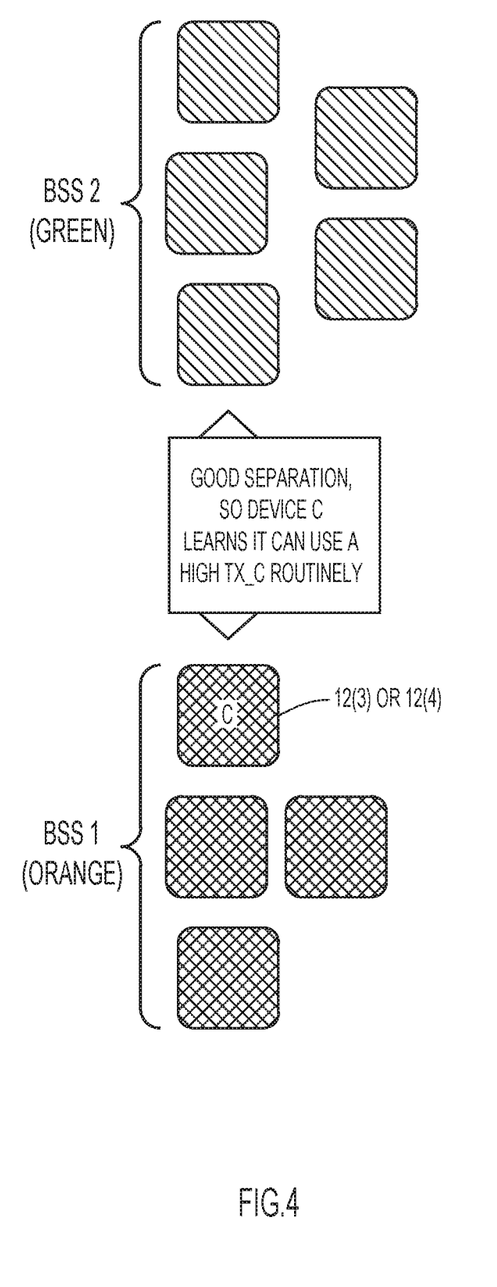
FIG. 4 is a diagram of a wireless network environment in which the computations depicted in FIG. 3 may be employed, according to an example embodiment.

With reference to FIGS. 3 and 4, still another embodiment is described as follows. Device C maintains a table with number of rows equal to the number of BSS_COLORs and minTX as columns, or more generally, a minimum/averaging state associated with that BSS_COLOR, e.g., minimum of the current window and immediately previous window, PPDU count per window. For each "shortPpdu+responsePpdu+high-efficiency PPDU (hePpdu)" exchange or "[Beacon or other AP frame] . . . hePpdu+responsePpdu" exchange pair (hePpdu could be PS-Poll/UAPSD trigger) sniffed by device C, device C:

a. Determines TX_C_permittedMax<simpleSafeCcaParameter−(RSSI_BC+M); and     b. Updates the minTX for that BSS_COLOR.

As shown in FIG. 3, device C calculates a minimum of TX_C_permittedMax every 110 exchanges (or 110 ms), and a minimum of TX_C_permittedMax over the exchanges since the last whole 110 (or 110 ms slot), and then minTXnew=min(minimum of TX_C_permittedMax every 110 exchanges/ms, a minimum of TX_C_permittedMax over the exchanges since the last whole 110 exchanges/ms). The minTX tracks the minimum of TX_C_permittedMax across the current partial window plus the previous full window.

The numbers in FIG. 3 are examples only, the min(.) operator may be replaced by some min-like function that includes some level of averaging also, and maintaining a reference over one "window" and any subsequent fractional window might be generalized too, to a sliding window, multiple windows and so forth.

In this embodiment, device C can transmit during a PPDU with a different BSS_COLOR at TX_C if a) TX_C<=minTX for that BSS_COLOR orb) VHT CCA rules permit it to do so.

As a summary, in this embodiment, it is proposed to use "shortPpdu+responsePpdu+hePpdu" or "Beacon . . . hePpdu+responsePpdu" as samples from which to learn about the OBSS environment, organized per BSS_COLOR. The proposed learning (i.e., the min operator over a recent window) is deliberately chosen to be highly responsive to changed conditions including new transmitters. As shown in FIG. 4, when there is a good separation between BSS's, device C will learn it can routinely use a relatively high TX_C.

An extension to this embodiment further addresses intermittent transmitters. If an intermittent transmitter is far from its intended receiver and has not transmitted in the last 110+ exchanges/ms, then its neighbors' minTX values do not account for the intermittent transmitter. The extension may use a) non-HE PPDU or b) RSSI from a Beacon frame, then HE PPDU+Ack/BA, or c) RTS+CTS or shortLegacyPpdu+Ack before an HE PPDU. Either b) or c) immediately updates the Simple Safe CCA rule (minTX) of their neighbors.

A further extension to this embodiment addresses Power Save devices. Upon wake-up, power save devices do not have adequate information (e.g., they do not have data on the last 110+ exchanges/ms). The extension requires power save devices to use very high throughput (VHT) CCA rules until they have adequate information. An alternative is for an AP to push down minTX values (e.g. 64 values*4-8 bits) in response to a PS-Poll or UAPSD trigger frame taking into account recent and historical minTX tables. In this extension, clients may send (after a request, unsolicited, or periodically) their minTX tables to their associated AP.

Thus, device C may send, to one or more associated client devices, data for the minimum transmit power, with respect to the particular subset of the plurality of service sets, or receive from one or more client devices, data or the minimum transmit power.

A third extension to this embodiment proposes to split information about each neighboring BSS color into two or more bins based on the received RSSI from the PPDUs originating from that BSS color. A separate TX_C_permitted max is computed for each bin. The transmitting device C obtains its power output limit based on the BSS color of the present packet, as well as its RSSI such that the correct bin from this BSS color's information can be chosen.

Figure 5A:
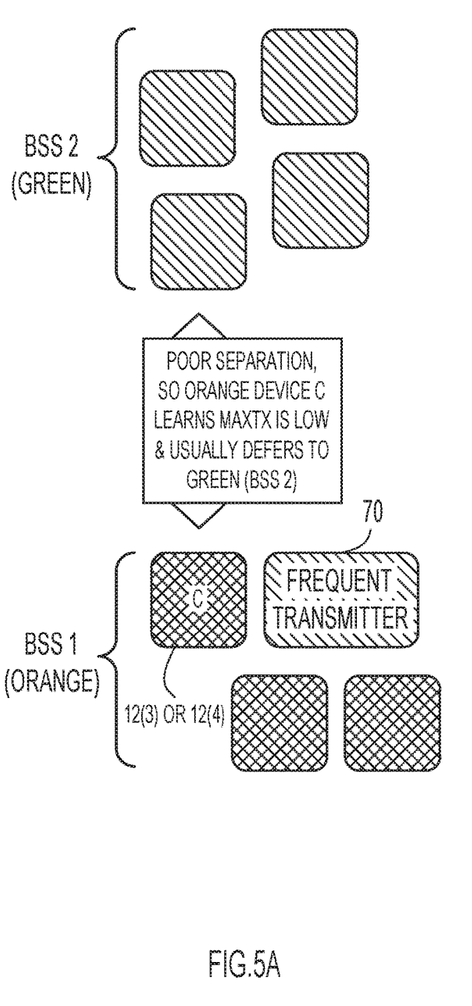
FIGS. 5A and 5B are diagrams of wireless network environments illustrating further applications of the computations depicted in FIG. 3 may be employed, according to an example embodiment.
Figure 5B:
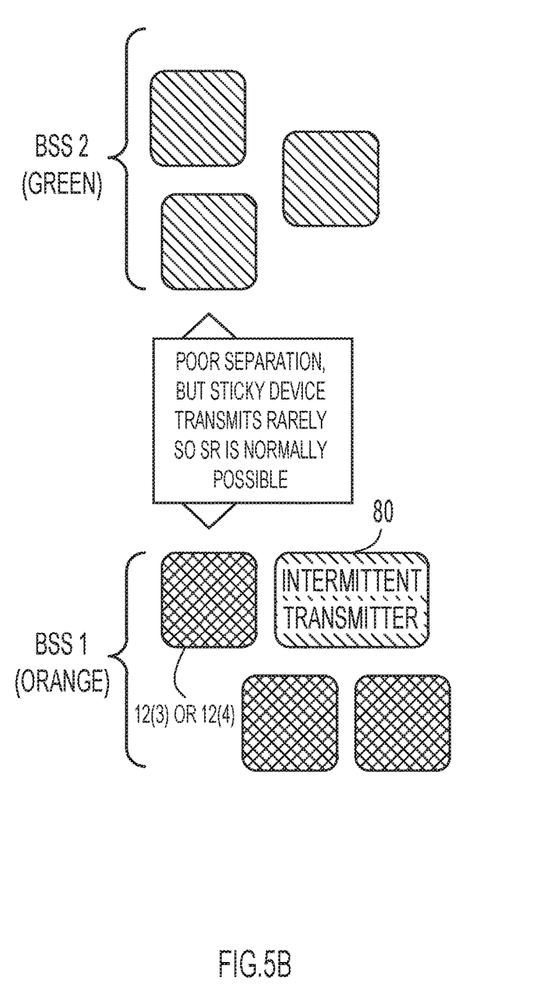

FIG. 5A shows an example, similar to that shown in FIG. 4. However, in FIG. 5, there is poor separation between neighboring BSSs BSS 1 and BSS 2. That is, device 70, which is part of BSS 2 and is a frequent transmitter, is quite close to device C. Device C learns that maxTX is low, in which case it will defer to transmissions for BSS 2. In FIG. 5B, by contrast, device 80, which is part of BSS 2, is an intermittent transmitter. Even though device 80 transmits intermittently, it can immediately refresh the maxTX of neighboring device C using RTS/CTS before its longPpdu.

Figure 6:
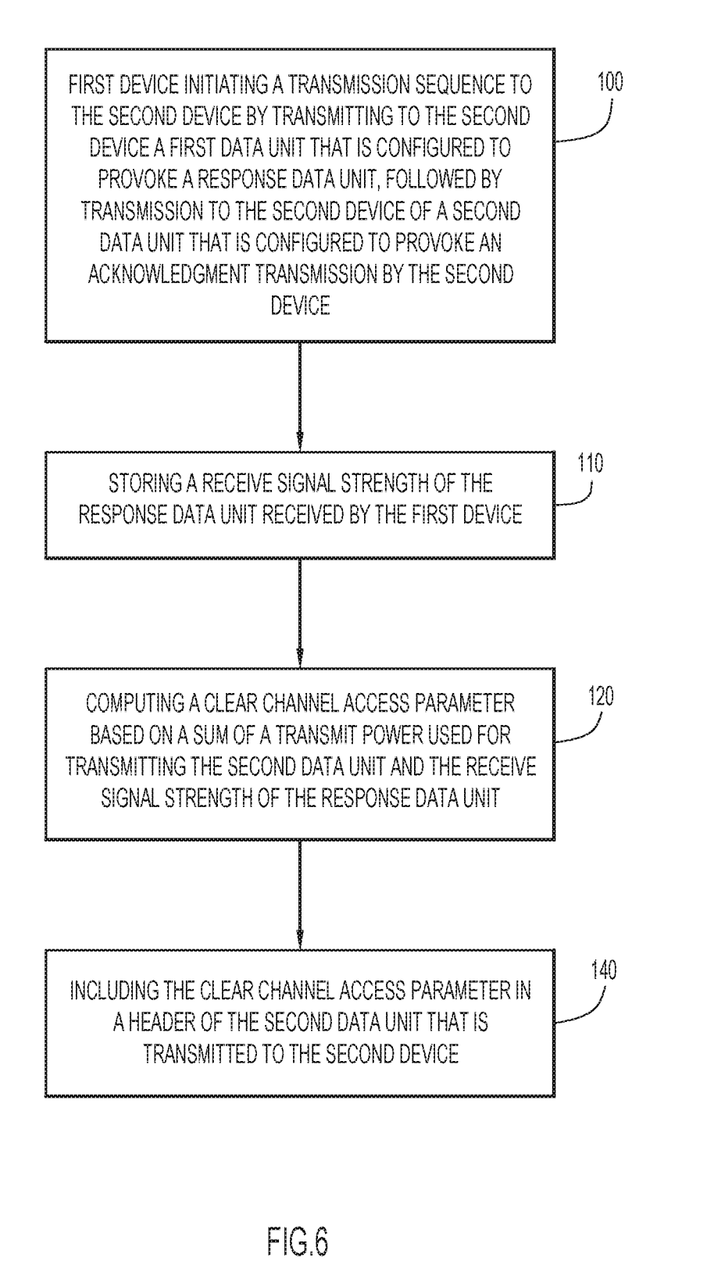
FIGS. 6 and 7 are high-level flow charts depicting operations performed by wireless devices according to an example embodiment.

Reference is now made to FIG. 6 for a description of a high-level flow chart depicting operations performed by a wireless device according to the embodiments presented herein. This flow chart depicts operations performed by one of a plurality of wireless devices operating in a wireless network. The wireless network environment includes first and second devices that are part of a first service set and third and fourth devices that are part of a second service set. The third and fourth devices are sufficiently proximate to the first and second devices so as to receive transmissions sent between the first and second devices. In step 100, the first device initiates a transmission sequence to the second device by transmitting to the second device a first data unit that is configured to provoke a response data unit, followed by transmission to the second device of a second data unit that is configured to provoke an acknowledgment transmission by the second device. In step 110, the first device stores a receive signal strength of the response data unit received by the first device. At 120, the first device computes a clear channel access parameter based on a sum of a transmit power used for transmitting the second data unit and the receive signal strength of the response data unit. At 130, the first device includes the clear channel access parameter in a header of the second data unit that is transmitted to the second device.

Figure 7:
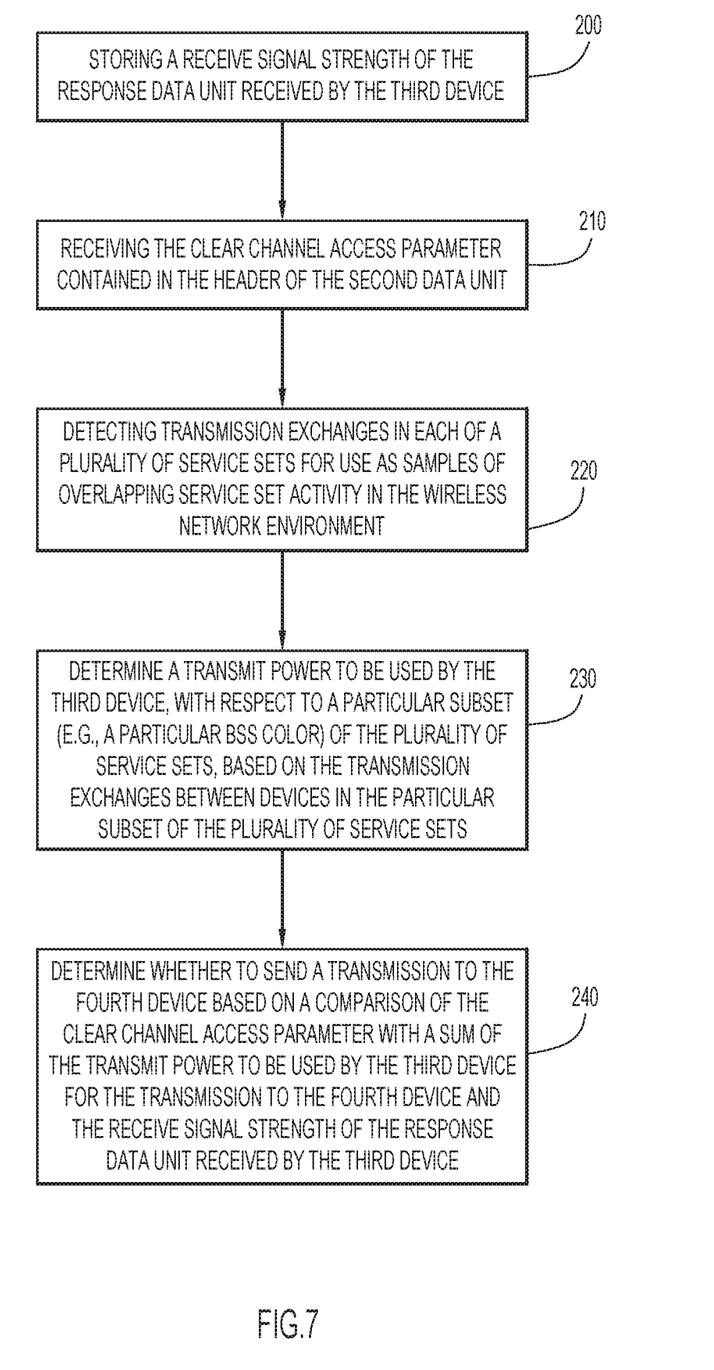

Reference is now made to FIG. 7. FIG. 7 illustrates operations performed by the third device in the wireless network environment described above in connection with FIG. 6. At 200, the third device stores a receive signal strength of the response data unit received by the third device. At 210, the third device receives the clear channel access parameter contained in the header of the second data unit (transmitted by the first device to the second device).

At 220, transmission exchanges are detected in each of a plurality of service sets for use as samples of overlapping service set activity in the wireless network environment.

At 230, a transmit power is determined to be used by the third device, with respect to a particular subset (e.g., a particular BSS color) of the plurality of service sets, based on the transmission exchanges between devices in the particular subset of the plurality of servicesets.

At 240, the third device determines whether to send a transmission to the fourth device based on a comparison of the clear channel access parameter with a sum of the transmit power to be used by the third device for the transmission to the fourth device and the receive signal strength of the response data unit received by the third device.

The determination in step 240 may involve determining to send the transmission to the fourth device when the clear channel access parameter is greater than a sum of the transmit power to be used by the third device for the transmission to the fourth device and the receive signal strength of the response data unit received by the third device. Moreover, this determining may involve comparing the clear channel access parameter with the sum of the transmit power to be used by the third device for the transmission to the fourth device, the receive signal strength of the response data unit received by the third device, and a margin value. The margin value may be a fixed value or dependent on a modulation and coding scheme used by the third device to send the transmission to the fourth device. Further still, the margin value may be advertised in a data unit transmitted by the first device. Further yet, the third device may determine to transmit during a data unit transmitted in the particular subset of the plurality of service sets when the transmit power used by the third device is less than the minimum transmit power for the particular subset of the plurality of service sets.

The determination step 230 may involve computing a maximum transmit power permitted to be used by the third device, with respect to the particular subset of the plurality of service sets, based on transmission exchanges between devices in the particular subset of the plurality of service sets that are received by the third device; computing a first minimum of the maximum transmit power over a time window spanned by a predetermined number of transmission exchanges and a second minimum of the maximum of the transmit power since a most recent time window; updating a minimum transmit power to be used by the third device, with respect to the particular subset of the plurality of service sets, based on a minimum of the first minimum and the second minimum; and storing the minimum transmit power with respect to the particular subset of the plurality of service sets, at the third device.

The transmission exchanges that are observed/detected by the third device as samples of activity in overlapping service sets may include: (a) a non-high efficiency data unit sent by the first device followed by a high-efficiency data unit sent by the first device and an acknowledgment; (b) a Beacon frame sent by the first device, followed by a high-efficiency data unit sent by the first device and an acknowledgement; (c) a request-to-send/clear-to-send exchange before a high efficiency data unit; or (d) a short legacy data unit followed by an acknowledgment before a high efficiency data unit.

Figure 8:
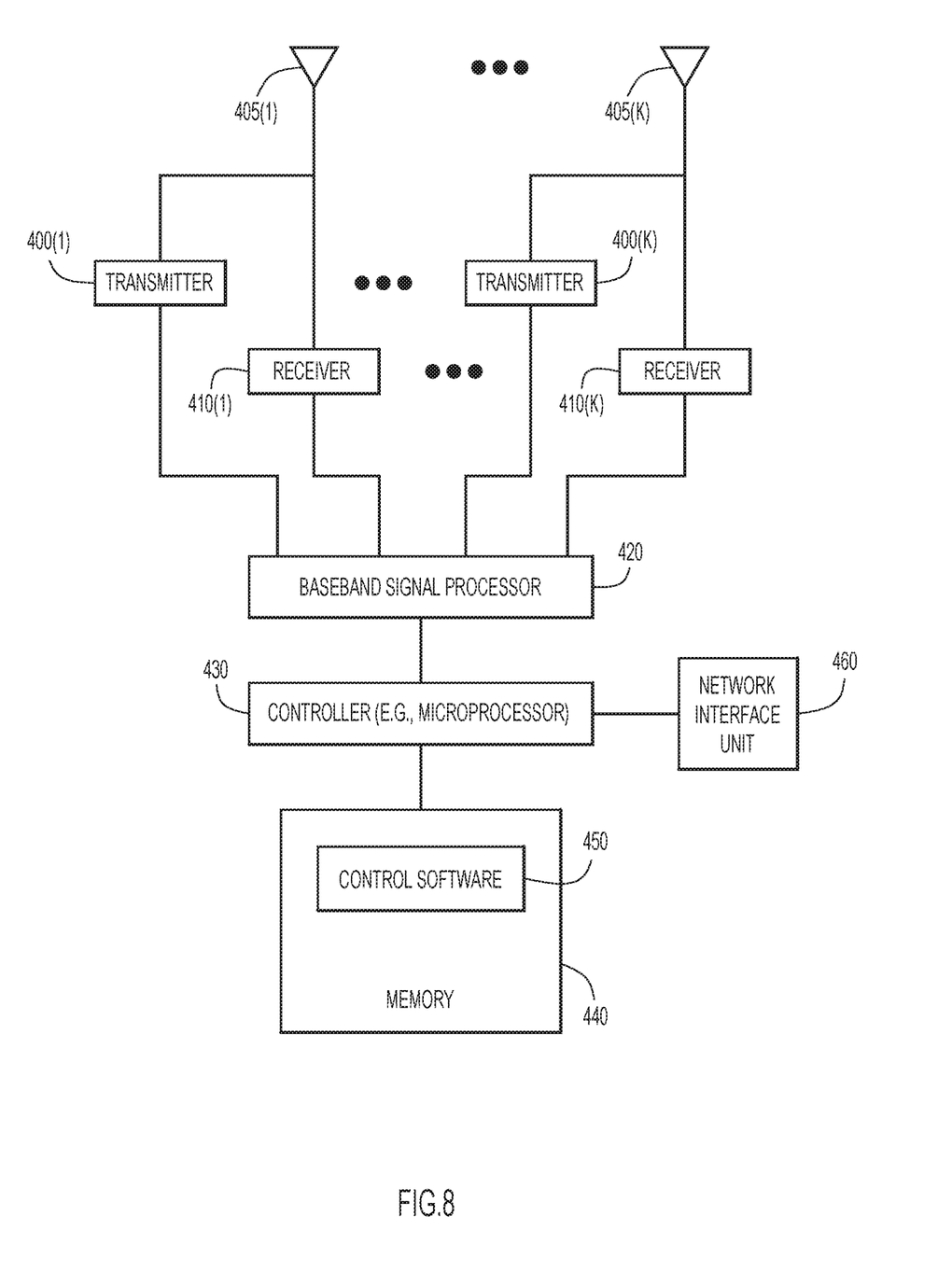
FIG. 8 is block diagram of a wireless device configured to perform the operations presented herein, according to an example embodiment.

Reference is now made to FIG. 8 for a description of a wireless device that may be configured to perform the operations described herein. The block diagram shown in FIG. 8 is representative of any of the devices whose operations are described above in connection with FIGS. 1-7, and may be for an AP or a client device (STA). The wireless device includes a plurality of transmit upconverters 400(1)-400(K) each connected to a corresponding one of the antennas 405(1)-405(K) and a plurality of receive downconverters 410(1)-410(K) each connected to a corresponding one of the antennas 405(1)-405(K). FIG. 8 is meant to cover the case in which a wireless device has multiple antennas and signal processing capabilities for MIMO and beamforming techniques, as described above.

A baseband signal processor 420 (e.g., modem) is provided that is connected to the plurality of transmit upconverters 400(1)-400(K) and to the plurality of receive downconverters 410(1)-410(K). The baseband signal processor 420 performs the baseband transmit signal processing of signals to be transmitted via the plurality of antennas 405(1)-405(K), e.g., for MU-MIMO and single user transmissions, and performs the baseband receive processing of signals that are received by the plurality of antennas 405(1)-405(K). The baseband signal processor 420 may take the form of one or more integrated circuits including fixed or programmable digital logic gates to perform various functions such as analog-to-digital conversion, digital-to-analog conversion, Fast Fourier Transform, etc.

A controller 430 is provided that may take the form of one or more microprocessors or microcontrollers. A memory 440 is provided that stores instructions for control software 450. There also is a network interface unit 460 that enables wired network connectivity. Alternatively, the controller may be embodied by one or more integrated circuits including fixed or programmable digital logic gates.

The memory 440 may include read only memory (ROM), random access memory (RAM), magnetic disk storage media devices, optical storage media devices, flash memory devices, electrical, optical, or other physical/tangible memory storage devices. Thus, in general, the memory 440 may include one or more tangible (non-transitory) computer readable storage media (e.g., a memory device) encoded with control software 450 comprising computer executable instructions and when the software is executed (by the controller 430) it is operable to perform the operations described herein.

The signal processing operations described herein may be performed by the baseband signal processor 420 alone using digital signal processing techniques, the controller 430 alone, or partly by the baseband signal processor 420 and party by the controller 430. In one form, the baseband signal processor 420 is implemented in one or more application specific integrated circuits (ASICs).

In summary, a wireless network environment includes first and second devices that are part of a first service set and third and fourth devices that are part of a second service set. The third and fourth devices are sufficiently proximate to the first and second devices such that the third and fourth devices receive transmissions sent between the first and second devices. In such a wireless network environment, the third device may perform a method that includes storing a receive signal strength of a received response data unit transmitted by the second device in response to reception by the second device of a first data unit transmitted by the first device. The method further includes obtaining a clear channel access parameter included in a header of a second data unit transmitted by the first device to the second device. Moreover, the third device may detect transmission exchanges in each of a plurality of service sets for use as samples of overlapping service set activity in the wireless network environment. The method then determines a minimum transmit power to be used by the third device, with respect to a particular subset of the plurality of service sets, based on the transmission exchanges between devices in the particular subset of the plurality of service sets. The third device may then determine whether to send a transmission from the third device to the fourth device based on a comparison of the clear channel access parameter with a sum of the minimum transmit power to be used by the third device for transmission to the fourth device and the receive signal strength of the received response data unit.

In another embodiment, the method determines the minimum transmit power to be used by the third device by computing a maximum transmit power permitted to be used by the third device, with respect to the particular subset of the plurality of service sets, based on transmission exchanges between devices in the particular subset of the plurality of service sets; computing a first minimum of the maximum transmit power over a time window spanned by a predetermined number of transmission exchanges and a second minimum of the maximum of the transmit power since a most recent time window; updating the minimum transmit power to be used by the third device, with respect to the particular subset of the plurality of service sets, based on a minimum of the first minimum and the second minimum; and storing the minimum transmit power with respect to the particular subset of the plurality of service sets, at the third device.

In another aspect, the method further includes determining to transmit during a data unit transmitted in the particular subset of the plurality of service sets when the transmit power used by the third device is less than the minimum transmit power for the particular subset of the plurality of service sets.

In another embodiment, the transmission exchanges include (a) a non-high efficiency data unit sent by the first device followed by a high-efficiency data unit sent by the first device and an acknowledgment; (b) a Beacon frame sent by the first device, followed by a high-efficiency data unit sent by the first device and an acknowledgement; (c) a request-to-send/clear-to-send exchange before a high efficiency data unit; or (d) a short legacy data unit followed by an acknowledgment before a high efficiency data unit.

In yet another embodiment, the method also includes sending, to one or more associated client devices, data for the minimum transmit power, with respect to particular subset of the plurality of service sets, or receiving from one or more client devices, data or the minimum transmit power.

Moreover, the clear channel access parameter is based on a sum of a transmit power used by the first device to transmit the second data unit to the second device and a receive signal strength of the response data unit at the first device.

In another aspect, the method also includes determining to send the transmission to the fourth device when the clear channel access parameter is greater than a sum of the transmit power to be used by the third device for the transmission to the fourth device and the receive signal strength of the response data unit received by the third device.

In another embodiment, an apparatus includes a communication interface configured to enable network communications and a processing device coupled with the communication interface. The processing device is configured to store a receive signal strength of a received response data unit transmitted by a first device in response to reception by the first device of a first data unit transmitted by a second device; obtain a clear channel access parameter included in a header of a second data unit transmitted by the second device to the first device; detect transmission exchanges in each of a plurality of service sets for use as samples of overlapping service set activity in a wireless network environment; determine a minimum transmit power to be used, with respect to a particular subset of the plurality of service sets, based on the transmission exchanges between devices in the particular subset of the plurality of service sets; and determine whether to send a transmission to a third device based on a comparison of the clear channel access parameter with a sum of the minimum transmit power to be used for transmission to the third device and the receive signal strength of the received response data unit.

In yet another embodiment, one or more non-transitory computer readable storage media is encoded with instructions that, when executed by a processor, cause the processor to store a receive signal strength of a received response data unit transmitted by a first device in response to reception by the first device of a first data unit transmitted by a second device; obtain a clear channel access parameter included in a header of a second data unit transmitted by the second device to the first device; detect transmission exchanges in each of a plurality of service sets for use as samples of overlapping service set activity in a wireless network environment; determine a minimum transmit power to be used, with respect to a particular subset of the plurality of service sets, based on the transmission exchanges between devices in the particular subset of the plurality of service sets; and determine whether to send a transmission to a third device based on a comparison of the clear channel access parameter with a sum of the minimum transmit power to be used for transmission to the third device and the receive signal strength of the received response data unit.

The above description is intended by way of example only. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. In a wireless network environment that includes first and second devices that are part of a first service set and third and fourth devices that are part of a second service set, and the third and fourth devices being in sufficient proximity to the first and second devices to receive transmissions sent between the first and second devices, a method comprising:
storing at the third device a receive signal strength of a received response data unit transmitted by the second device in response to reception by the second device of a first data unit transmitted by the first device;
obtaining a clear channel access parameter included in a header of a second data unit transmitted by the first device to the second device;
detecting transmission exchanges in each of a plurality of service sets for use as samples of overlapping service set activity in the wireless network environment;
determining a minimum transmit power to be used by the third device, with respect to a particular subset of the plurality of service sets, based on the transmission exchanges between devices in the particular subset of the plurality of service sets; and
determining whether to send a transmission from the third device to the fourth device based on a comparison of the clear channel access parameter with a sum of the minimum transmit power to be used by the third device for transmission to the fourth device and the receive signal strength of the received response data unit.

2. The method of claim 1, wherein determining the minimum transmit power to be used by the third device comprises:
computing a maximum transmit power permitted to be used by the third device, with respect to the particular subset of the plurality of service sets, based on transmission exchanges between devices in the particular subset of the plurality of service sets;
computing a first minimum of the maximum transmit power over a time window spanned by a predetermined number of transmission exchanges and a second minimum of the maximum transmit power since a most recent time window;
updating the minimum transmit power to be used by the third device, with respect to the particular subset of the plurality of service sets, based on a minimum of the first minimum and the second minimum; and
storing the minimum transmit power with respect to the particular subset of the plurality of service sets, at the third device.

3. The method of claim 2, the third device further determining to transmit during a data unit transmitted in the particular subset of the plurality of service sets when a transmit power used by the third device is less than the minimum transmit power for the particular subset of the plurality of service sets.

4. The method of claim 3, wherein the transmission exchanges include (a) a non-high efficiency data unit sent by the first device followed by a high-efficiency data unit sent by the first device and an acknowledgment; (b) a Beacon frame sent by the first device, followed by a high-efficiency data unit sent by the first device and an acknowledgement; (c) a request-to-end/clear-to-send exchange before a high efficiency data unit; or (d) a short legacy data unit followed by an acknowledgment before a high efficiency data unit.

5. The method of claim 2, further comprising the third device sending, to one or more associated client devices, data for the minimum transmit power, with respect to particular subset of the plurality of service sets, or receiving from one or more client devices, data or the minimum transmit power.

6. The method of claim 1, wherein the clear channel access parameter is based on a sum of a transmit power used by the first device to transmit the second data unit to the second device and a receive signal strength of the received response data unit at the first device.

7. The method of claim 1, wherein determining whether to send comprises determining to send the transmission to the fourth device when the clear channel access parameter is greater than a sum of a transmit power to be used by the third device for the transmission to the fourth device and the receive signal strength of the received response data unit.

8. An apparatus comprising:
a communication interface configured to enable network communications;
a processing device coupled with the communication interface, and configured to:
store a receive signal strength of a received response data unit transmitted by a first device in response to reception by the first device of a first data unit transmitted by a second device;
obtain a clear channel access parameter included in a header of a second data unit transmitted by the second device to the first device;
detect transmission exchanges in each of a plurality of service sets for use as samples of overlapping service set activity in a wireless network environment;
determine a minimum transmit power to be used, with respect to a particular subset of the plurality of service sets, based on the transmission exchanges between devices in the particular subset of the plurality of service sets; and
determine whether to send a transmission to a third device based on a comparison of the clear channel access parameter with a sum of the minimum transmit power to be used for transmission to the third device and the receive signal strength of the received response data unit.

9. The apparatus of claim 8, wherein the processing device is further configured to:
compute a maximum transmit power permitted to be used, with respect to the particular subset of the plurality of service sets, based on transmission exchanges between devices in the particular subset of the plurality of service sets;

compute a first minimum of the maximum transmit power over a time window spanned by a predetermined number of transmission exchanges and a second minimum of the maximum transmit power since a most recent time window;

update the minimum transmit power to be used, with respect to the particular subset of the plurality of service sets, based on a minimum of the first minimum and the second minimum; and store the minimum transmit power with respect to the particular subset of the plurality of service sets.

10. The apparatus of claim 9, wherein the processing device is further configured to:

determine to transmit during a data unit transmitted in the particular subset of the plurality of service sets when a transmit power used is less than the minimum transmit power for the particular subset of the plurality of service sets.

11. The apparatus of claim 10, wherein the transmission exchanges include (a) a non-high efficiency data unit sent by the second device followed by a high-efficiency data unit sent by the second device and an acknowledgment; (b) a Beacon frame sent by the second device, followed by a high-efficiency data unit sent by the second device and an acknowledgement; (c) a request-to-send/clear-to-send exchange before a high efficiency data unit; or (d) a short legacy data unit followed by an acknowledgment before a high efficiency data unit.

12. The apparatus of claim 9, wherein the processing device is further configured to:

send, to one or more associated client devices, data for the minimum transmit power, with respect to particular subset of the plurality of service sets, or receiving from one or more client devices, data or the minimum transmit power.

13. The apparatus of claim 8, wherein the clear channel access parameter is based on a sum of a transmit power used by the second device to transmit the second data unit to the first device and a receive signal strength of the received response data unit at the second device.

14. The apparatus of claim 8, wherein the processing device is further configured to:

determine to send the transmission to the third device when the clear channel access parameter is greater than a sum of a transmit power to be used for the transmission to the third device and the receive signal strength of the received response data unit.

15. One or more non-transitory computer readable storage media encoded with instructions that, when executed by a processor, cause the processor to:

store a receive signal strength of a received response data unit transmitted by a first device in response to reception by the first device of a first data unit transmitted by a second device;

obtain a clear channel access parameter included in a header of a second data unit transmitted by the second device to the first device;

detect transmission exchanges in each of a plurality of service sets for use as samples of overlapping service set activity in a wireless network environment;

determine a minimum transmit power to be used, with respect to a particular subset of the plurality of service sets, based on the transmission exchanges between devices in the particular subset of the plurality of service sets; and determine whether to send a transmission to a third device based on a comparison of the clear channel access parameter with a sum of the minimum transmit power to be used for transmission to the third device and the receive signal strength of the received response data unit.

16. The non-transitory computer readable storage media of claim 15, wherein the instructions further cause the processor to:

compute a maximum transmit power permitted to be used, with respect to the particular subset of the plurality of service sets, based on transmission exchanges between devices in the particular subset of the plurality of service sets;

compute a first minimum of the maximum transmit power over a time window spanned by a predetermined number of transmission exchanges and a second minimum of the maximum transmit power since a most recent time window;

update the minimum transmit power to be used, with respect to the particular subset of the plurality of service sets, based on a minimum of the first minimum and the second minimum; and store the minimum transmit power with respect to the particular subset of the plurality of service sets.

17. The non-transitory computer readable storage media of claim 16, wherein the instructions further cause the processor to:

determine to transmit during a data unit transmitted in the particular subset of the plurality of service sets when a transmit power used is less than the minimum transmit power for the particular subset of the plurality of service sets.

18. The non-transitory computer readable storage media of claim 17, wherein the transmission exchanges include (a) a non-high efficiency data unit sent by the second device followed by a high-efficiency data unit sent by the second device and an acknowledgment; (b) a Beacon frame sent by the second device, followed by a high-efficiency data unit sent by the second device and an acknowledgement; (c) a request-to-send/clear-to-send exchange before a high efficiency data unit; or (d) a short legacy data unit followed by an acknowledgment before a high efficiency data unit.

19. The non-transitory computer readable storage media of claim 16, wherein the instructions further cause the processor to:

send, to one or more associated client devices, data for the minimum transmit power, with respect to particular subset of the plurality of service sets, or receiving from one or more client devices, data or the minimum transmit power.

20. The non-transitory computer readable storage media of claim 15, wherein the clear channel access parameter is based on a sum of a transmit power used by the second device to transmit the second data unit to the first device and a receive signal strength of the received response data unit at the second device.

* * * * *

UNITED STATES PATENT AND TRADEMARK OFFICE
CERTIFICATE OF CORRECTION

PATENT NO. : 10,568,134 B2  
APPLICATION NO. : 16/037480  
DATED : February 18, 2020  
INVENTOR(S) : Brian D. Hart et al.

Page 1 of 1

It is certified that error appears in the above-identified patent and that said Letters Patent is hereby corrected as shown below:

In the Claims

Claim 4, Column 14, Line 16, please change "(c) a request-to-end/clear-to-send" to --(c) a request-to-send/clear-to-send--

Signed and Sealed this
Twenty-fourth Day of March, 2020

Andrei Iancu
*Director of the United States Patent and Trademark Office*